No. 661,994. Patented Nov. 20, 1900.
T. R. JORDAN.
APPARATUS FOR CONCENTRATING MINERALS, &c.
(Application filed Mar. 11, 1899. Renewed Aug 23, 1900.)

(No Model.) 2 Sheets—Sheet 1.

Witnesses

Inventor
Thomas Rowland Jordan
By W. W. Dudley
his Attorneys.

UNITED STATES PATENT OFFICE.

THOMAS ROWLAND JORDAN, OF NEW YORK, N. Y., ASSIGNOR TO THE JORDAN GRAVITATION PROCESS COMPANY, OF NEW YORK.

APPARATUS FOR CONCENTRATING MINERALS, &c.

SPECIFICATION forming part of Letters Patent No. 661,994, dated November 20, 1900.

Application filed March 11, 1899. Renewed August 23, 1900. Serial No. 27,823. (No model.)

*To all whom it may concern:*

Be it known that I, THOMAS ROWLAND JORDAN, a subject of the Queen of Great Britain, residing at New York, in the county of New York and State of New York, have invented certain new and useful Improvements in Apparatus for the Concentration of Minerals and the Like; and I do declare the following to be a full, clear, and exact description of the invention, such as will enable others skilled in the art to which it appertains to make and use the same, reference being had to the accompanying drawings and to the letters of reference marked thereon, which form a part of this specification.

This invention is directed to the concentration of minerals and other bodies containing material capable of forming concentrates, the object of the improvement being the provision of a comparatively simple and inexpensive appliance by the employment of which the gangue or waste material is rapidly driven off and concentration of the precious material effected in a highly efficient and expeditious manner.

Generally speaking, my invention contemplates the provision of concentrating-tubes of novel construction adapted to be connected in a manner to secure control of the passage of the material in suspension through the tubes to vary the concentrating effects of the water-currents required by the different specific gravity of the materials contained in the bodies under treatment.

The invention in all of its details is hereinafter described with reference to the accompanying drawings, in which—

Figure 1:
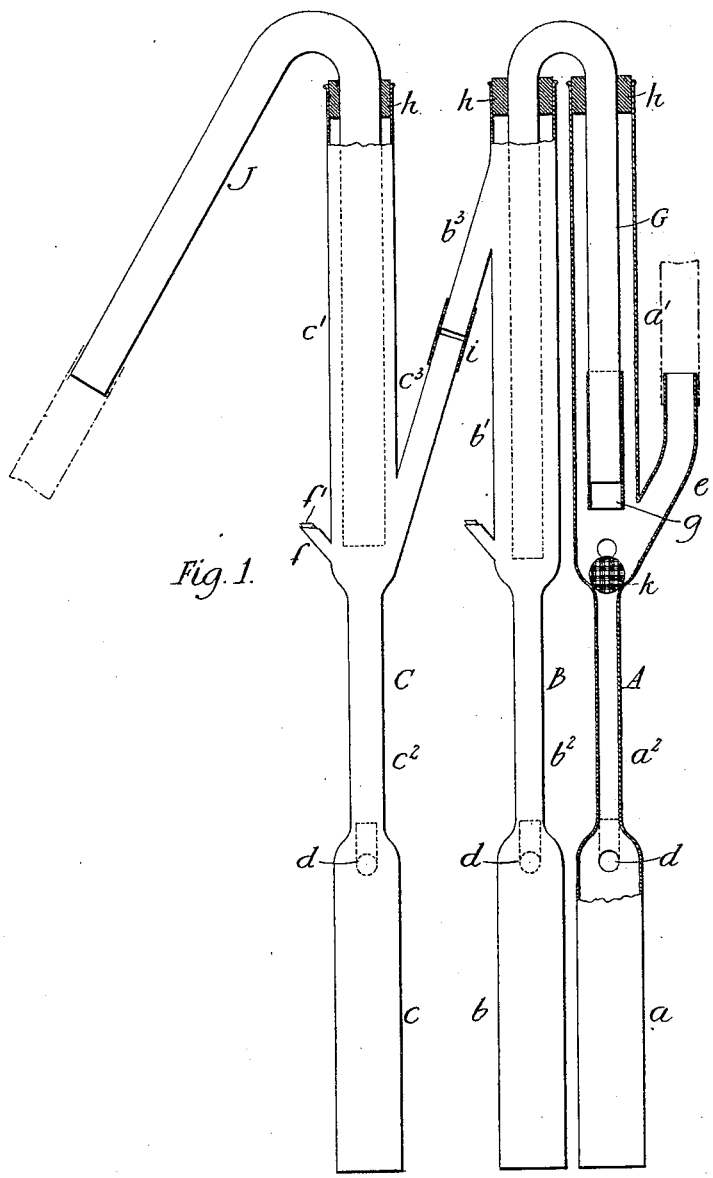
Figure 2:
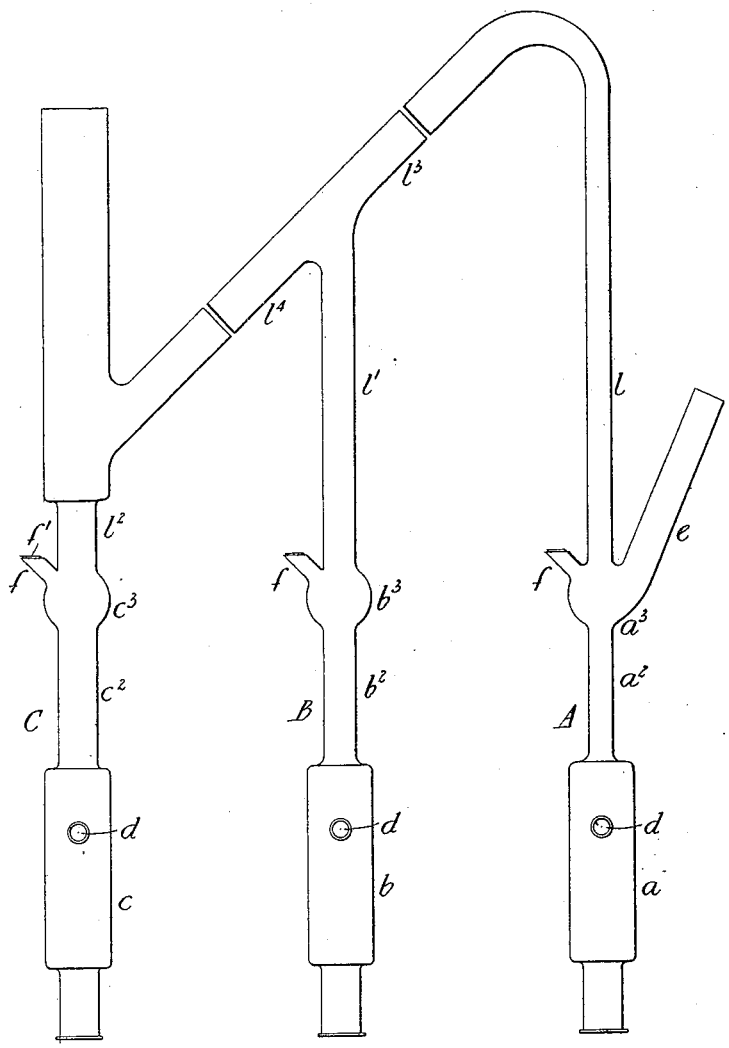

Figure 1 is an elevation, partly in section, of a series of concentrating-tubes embodying my invention. Fig. 2 is a similar view of a modification.

Referring to Fig. 1 of the said drawings by letter, A, B, and C denote tubes, each of which is provided toward its lower end with a chamber for the reception of the concentrates, the chambers being respectively lettered $a$, $b$, and $c$. Toward the upper ends of the tubes are other chambers, respectively lettered $a'$, $b'$, and $c'$, the diameter of which is preferably approximately the same as the diameter of the lower chambers. The upper and lower chambers of each tube are connected and intercommunicate with each other through a restricted tube portion, respectively lettered $a^2$, $b^2$, and $c^2$. Toward the upper end of the lower chamber of each tube is an inlet $d$ for water in controllable quantity. The water entering the tubes at the inlets thereof under pressure is caused to ascend with greater or less velocity, dependent upon the adjustment of a valve in the water-supply pipe. (Not shown.) Toward the lower end of the upper chamber $a'$ of tube A is an inlet $e$ for the material to be treated. The material in practice is fed into a tube connection with the inlet $e$, which connection is carried to a height sufficient to produce back pressure therein and compel the circulation of the water and the material through the tubes. Near the lower end of each upper chamber is an outlet $f$, the closure $f'$ of which is removed to flush the tubes if at any time it is found necessary to clean them.

Communication is established between the upper chambers $a'$ $b'$ of tubes A B by means of a siphon-tube G, the legs of which are passed through apertures in rubber or other stoppers $h$ at the upper ends of these chambers. This siphon connection is made to be adjustable for the purpose of controlling the suction action to which the material in solution is subjected, the adjustments being effected by the use of siphon-tubes of different diameters, in which case stoppers $h$, having apertures of corresponding diameter, are employed, or the adjustments may be effected by raising or lowering the siphon-tube to bring its ends nearer to or farther from the lower ends of the chamber where concentration takes place or by varying the relative lengths of the siphon-tube legs, which is accomplished by the adjustment of a telescoping section $g$. If desired, the relative location of the legs in the chambers may also be reversed to vary the velocity of the circulation.

Communication between the upper chambers $b'$ $c'$ of tubes B C is established by the employment of connected tube-sections $b^3$ $c^3$, the section $b^3$ extending from the upper end of the chamber $b'$ and the section $c^3$ extending from the lower end of chamber $c'$. Obviously these sections may be integral with each other; but I prefer to make them separate, as shown, and employ a rubber or other coupling $i$. In the upper end of the chamber $c'$ of tube C is an apertured stopper $h$, through which is passed one leg of a siphon-tube J, the other leg of this tube being adapted for connection with a discharge-tube which affords a conveyer for the gangue or waste material. This siphon-outlet is capable of being adjusted in the manner and for the purpose described with reference to the siphon connection G between the tubes A and B.

In operation water in controllable quantity is admitted at the upper end of each of the lower chambers $a$, $b$, and $c$ and the material is supplied to the tube A through the inlet $e$. The material entering the chamber $a'$ is subjected to the action of the rising water, which being under proper pressure operates to overcome the specific gravity of all but the heaviest particles of the material, the lighter particles, with the gangue or waste material, being carried with the water through the siphon-tube G into tube B. One of the functions of this siphon-tube is to exert a suction action on the water and material in suspension, and thus induce a more or less rapid circulation and expedite the separation of the heaviest particles. The provision of adjustment of the siphon connection is made to control the suction action on materials the particles of which vary in specific gravity, the provision above described enabling the degree of adjustment to be accurately and quickly performed, so that attendance and skill incident to the proper operation is the minimum. The heaviest particles collect in the lower chamber of tube A, while the lighter particles and gangue pass through the siphon-tube G into tube B. The restricted tube portion $b^2$ of this latter tube is preferably slightly larger in diameter than the tube portion $a^2$, and the pressure of the water column in tube B is preferably of less degree than the column in tube A, the result being that in this tube B the lighter particles are separated and collected, the lightest particles, with the gangue, passing through the tube-sections $b^2$ $c^3$ into tube C. In tube C the degree of pressure of the water-column is preferably further reduced, and the restricted tube portion $c^2$ and siphon-tube J are each of comparatively large diameter, whereby the suction action and water-pressure operate to separate the finest particles and to carry off through the tube J the gangue free from the precious material.

A further function of the siphon-tubes is to induce the passage of the material with the water in circulations, and thereby prevent accumulation in the portion of the tubes where concentration takes place. The suction action of the siphon-tubes tends to produce agitation of the particles of material, and thus in a measure preserve proper division thereof; but I find that perhaps greater efficiency is obtained by the use of mechanical agitators located near the inlet to the tubes. These agitators are preferably constructed to be operated by the water-column, the agitator shown being in the form of a ball $k$, having a corrugated or roughened surface which, rising and falling under the action of the ascending water-column, operates to keep the particles in thorough agitation.

The construction of tubes shown in Fig. 2 is similar in many respects to the construction above described, the differences which exist being in the form of the parts rather than in function and operation. In this modification the upper chambers $a^3$, $b^3$, and $c^3$ are of spherical form and from the upper ends thereof extend tubes respectively lettered $l$ $l'$ $l^2$ of gradually increasing diameter. The tube $l'$ of tube B has branches $l^3$ $l^4$, which respectively connect with the upper end of tube $l$ and the lower end of tube $l^2$, and to the upper end of tube $l^2$ is connected a discharge-tube for the waste material.

I claim as my invention—

1. In a concentrating apparatus, a plurality of tubes having inlets toward their lower end for water in controllable quantity, one of the tubes having between its ends an inlet for material, and an adjustable siphon connection affording a passage between the upper portions of certain of the tubes.

2. In a concentrating apparatus, a plurality of tubes having upper and lower chambers connected by restricted tube portions, inlets at the lower chambers for water in controllable quantity, an inlet for material at the upper chamber of one of the tubes, and an adjustable siphon-tube connecting the upper chambers of two of the tubes.

3. In a concentrating apparatus, a plurality of tubes having inlets toward their lower ends for water in controllable quantity, an inlet for material toward the upper end of one of the tubes, and a reversible siphon-tube connecting the upper ends of the tubes, one of the siphon-legs being adjustable as to length.

4. In a concentrating apparatus, a plurality of tubes having upper and lower chambers connected by restricted tube portions, inlets at the lower chambers for water in controllable quantity, an inlet for material at the upper chamber of one of the tubes, a siphon connection between the first and second tubes of the series, a connection between the second and third tubes, a siphon-outlet from the third tube, and a water-current-operated agitator in the chamber adjacent to the inlet for material.

5. In a concentrating apparatus, a plurality of tubes having upper chambers, and lower chambers into which water in controllable quantity is introduced, an inlet for material at the upper chamber of one of the tubes, a siphon connection between the first and second tubes of the series, a tube connection between the second and third tubes of the series, and a siphon-tube affording an outlet from the third tube.

6. In a concentrating apparatus, a plurality of tubes having connected upper and lower chambers, inlets at the lower chambers for water in controllable quantity, an inlet for material at the upper chamber of one of the tubes, an adjustable siphon-tube connecting the upper chambers of two of the tubes, and a flushing-outlet toward the lower end of the upper chamber of each of the tubes.

7. In a concentrating apparatus, a plurality of tubes having upper and lower chambers connected by restricted tube portions, controllable water-inlets at the lower chambers whereby water passing into the successive tubes may be at relatively diminishing pressures, an inlet for material of the upper chamber of one of the tubes, an adjustable siphon connection between certain of the tubes, and a siphon-outlet from the last tube of the series.

In testimony whereof I affix my signature in presence of two witnesses.

THOMAS ROWLAND JORDAN.

Witnesses:
W. T. NORTON,
ARTHUR BENNING.